July 17, 1934.  H. J. HICK  1,967,089
FISH BAIT OR PLUG
Filed May 11, 1932
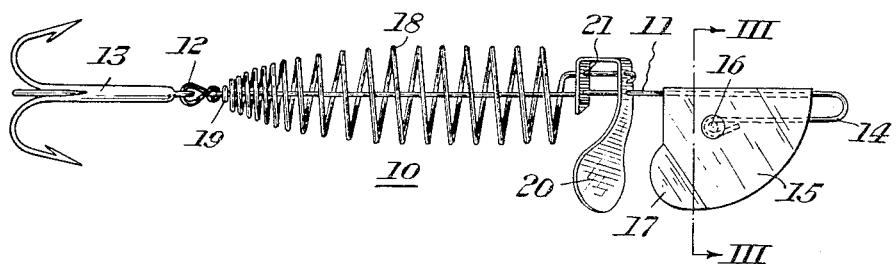
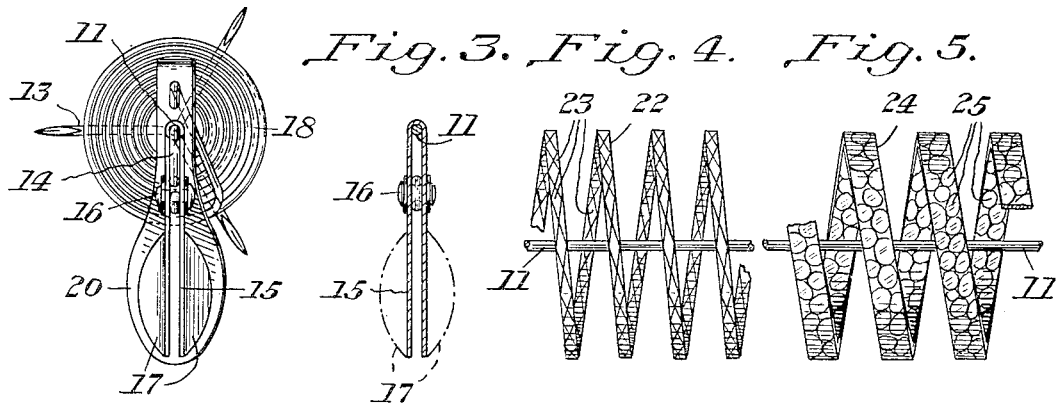
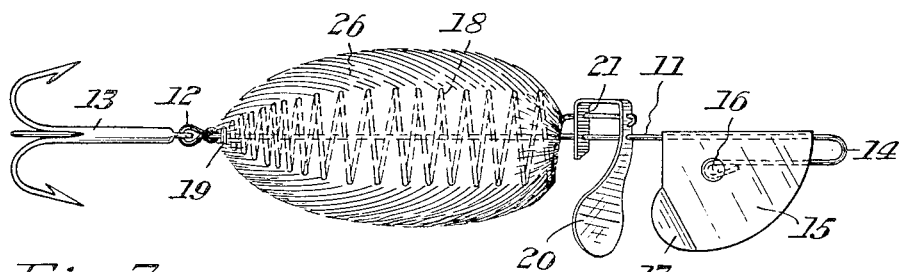
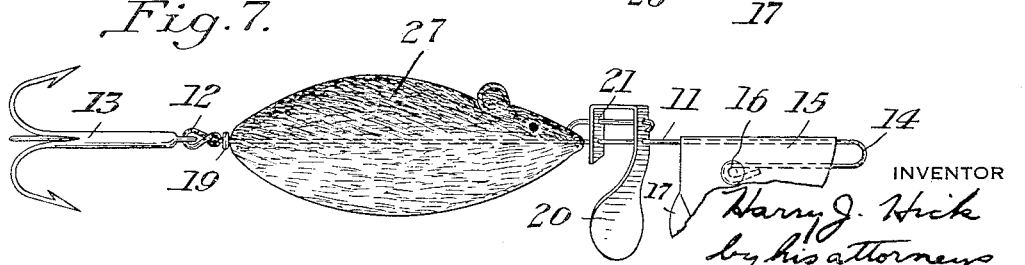
INVENTOR
Harry J. Hick
by his attorneys
Byrnes, Stebbins, Parmelee & Blenko Patented July 17, 1934

1,967,089

UNITED STATES PATENT OFFICE 1,967,089

FISH BAIT OR PLUG

Harry J. Hick, Alliance, Ohio, assignor to Clarence J. Rodman, Alliance, Ohio

Application May 11, 1932, Serial No. 610,520

5 Claims. (Cl. 43—47)

My invention relates to an artificial lure or bait for fish.

While numerous types of artificial baits or plugs are already known, all such devices with which I am familiar are characterized by certain objectionable features which have seriously interfered with their success in use. I have invented a device of this character which overcomes most of the objections to previously known plugs and, in addition, is characterized by additional features of novelty not approached by any present types of these devices.

In accordance with my invention, I provide a fish bait or plug having a central stem to the rear end of which a multiple hook is attached. To the other end of the stem, a head is attached, having adjustable fins for regulating the depth at which the bait operates. A spiral spring tapering toward the hook is rotatably mounted on the stem and is provided with a spinner having an inclined blade such that advancement of the bait through the water causes rotation of the spring, with the result that a very close simulation to the appearance of a live bait is obtained. For a more complete understanding of the invention, reference is made to the accompanying drawing illustrating a present preferred embodiment, although it is to be understood that many changes therein may be made within the scope of my broader claims. In the drawing:

Figure 1 is a side elevation of the invention;

Figure 2 is an end view looking from the right in Figure 1;

Figure 3 is a sectional view taken along the line III—III of Figure 1;

Figure 4 is a partial elevation to enlarged scale illustrating a modified form of the spiral spring element;

Figure 5 is a view similar to Figure 4 illustrating a further modification;

Figure 6 is a view similar to Figure 1 illustrating a still further modification, and Figure 7 is another modification.

Referring in detail to the drawing, the bait 10 shown in Figures 1 through 3 comprises a central stem 11, one end of which is looped at 12 through the eye of a multiple hook 13. The other end of the stem 11 is bent back upon itself at 14 to form an eye for the attachment of a line or leader. A head 15 comprising a flat plate bent into U-shape and of outline similar to that of a fish's head is secured to the end 14 of the stem 11 by means of a rivet 16. Fins 17 at the rear of the head 15 are provided for regulating the depth at which the bait operates in the water. The fins may be adjusted by bending them inwardly or outwardly, as shown in Figures 2 and 3.

A tapering spiral spring element 18 is rotatably mounted on the stem 11. A bearing 19 spaces the spring from the loop 12. A spinner 20 is journaled on the stem 11 and the forward end of the spiral 18 is secured thereto at 21. The spinner 20 is shaped in the known manner so that as the bait is drawn through the water, the spinner and the spiral revolve rapidly.

By making the spiral 18 of metal which takes a high polish or by plating any suitable metal with a highly reflecting surface, a very desirable lure is provided. The rotation of the spiral 18 gives an optical effect which, together with the head 15 and the hook 13, approaches quite closely the underwater appearance of the smaller fish on which game fish feed. The fins 17, when bent outwardly, provide a downward component of force acting on the bait as it is drawn forward through the water so that the latter may be caused to operate at greater or less depths by correspondingly adjusting the fin 17. Naturally, the bait will sink if cast, but the reeling in process tends to draw it to the top of the water unless a downward component is provided for maintaining the bait below the surface.

Figure 4 illustrates a slight modification of the invention already described. Instead of using round wire for the spiral 18 as in Figure 1, Figure 4 illustrates a spiral 22 formed of round wire which has been passed through suitable dies to provide a plurality of reflecting surfaces or facets 23 thereon and slightly flat in the water These surfaces may be of diamond or other shape and the effect is to heighten the glistening effect of the rotating spiral.

Figure 5 illustrates a further modification in which a spiral 24 is formed of flat strip or metallic tape, the surface of which has been hammered or otherwise treated to provide a plurality of reflecting surfaces 25. These surfaces may be formed from the metal itself or may be formed by other material secured to the tape. It is possible, for example, to cement fish scales or other pearly material, such as bits of shell, to the spiral so as to increase the iridescent appearance of the bait.

Figure 6 illustrates a further modified form of the invention which is identical with that of Figure 1 except that a plurality of bristles or hairs 26 are secured to the spiral. This produces a very effective bait since certain species of fish prefer live young mice to any other bait at certain times. Instead of a spiral member, a solid body 27 for the bait may be molded or formed from sheet material and provided with actual bristles or be decorated to imitate a furry surface, as shown in Figure 7.

It will be apparent from the foregoing description that the invention is characterized by numerous advantages. One of these is that it is of simple construction and can therefore be readily manufactured at a comparatively low cost. The spiral provides internal and external reflection which may be enhanced to a marked degree by using appropriate reflecting metals as plating on the spiral. The bait is characterized by a movement when in action in the water which is highly alluring to the fish. As before stated, the simulation of the appearance of a live minnow is very deceiving. The bait is light in weight and may, therefore, be easily cast. It is not subject, furthermore, to much wind force because of its open construction.

Due to its light openwork construction, furthermore, the bait makes very little disturbance when striking the water. It is thus less likely to frighten away the fish than other types of bait which are larger and heavier. The bait, at the same time, can be made to appear very large in proportion to its weight because of the open character of its construction.

The bait has another advantage in that if a game fish seizes the body of the bait, that is, the spring 18, the latter will be compressed and if the bait is drawn through the fish's mouth, the hook 13 is quite likely to seize the fish even though it does not take the hook in its mouth. The bait is not as liable to kink the line as some types now used. The function of the fins in adjusting the depth at which the bait operates has already been mentioned. The head 15, in addition to simulating the head of a bait fish, also serves as a steering vane or blade.

Although I have illustrated and described herein but one preferred embodiment of the invention, together with certain modifications thereof, it will be apparent that the invention may be embodied in forms other than those shown without departing from the spirit of the invention or the scope of the appended claims.

I claim:

1. In a fish bait, a stem, a plate bent double around the stem, a loop formed on the stem protruding from between bent portions of the plate, and fins bent outwardly from said portions for exerting a downward force on the bait when it is drawn through the water.

2. In a fish bait, a stem, a piece of sheet metal having portions depending around the stem, and fins bent outwardly from said portions for exerting a downward force on the bait when it is drawn through the water.

3. In a fish bait, a stem having one end bent back upon itself and an eye formed in the bent back end, a plate bent double over the bent back end of the stem, the outline of the bent plate simulating that of a minnow head, and a rivet extending through the bent plate and the eye in the stem.

4. In a fish bait, a stem, a spinner having a bent back end traversed by the stem providing spaced bearings for the spinner, and means rotatable on the stem attached to said spinner.

5. In a fish bait, a spinner having one end bent to substantially U-shape, holes therein providing spaced bearings, a stem extending through said holes, and rotatable means on the stem attached to said spinner.

HARRY J. HICK.